Oct. 13, 1953  E. L. SCHOFIELD  2,655,197
CONVERTIBLE SEAT
Filed June 1, 1948  3 Sheets-Sheet 1
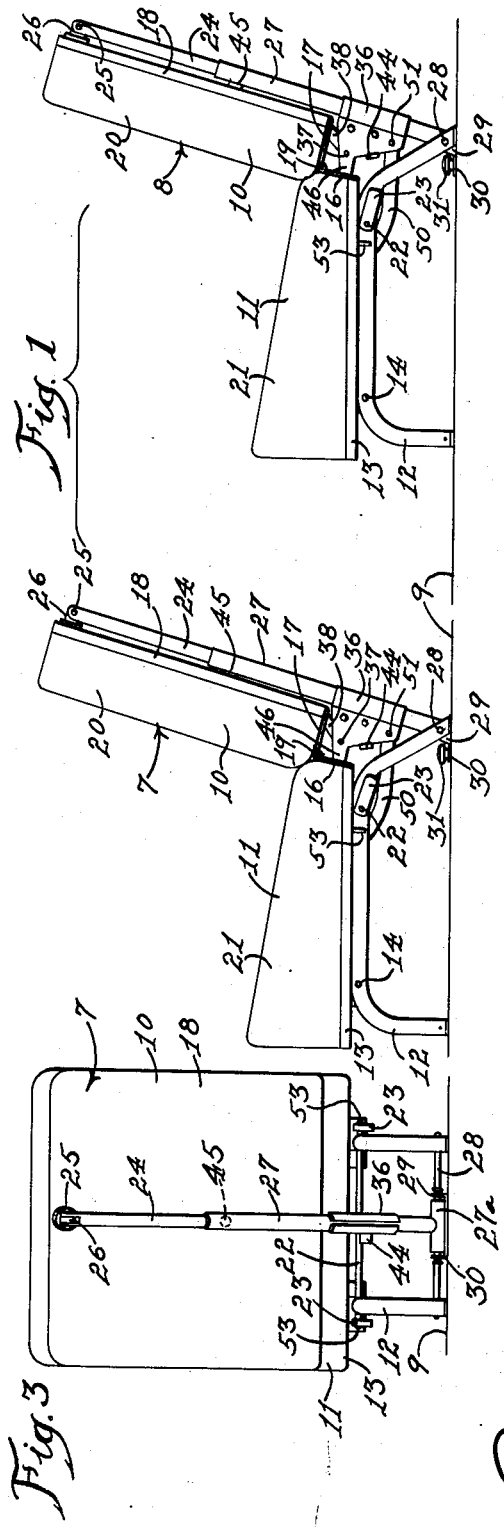
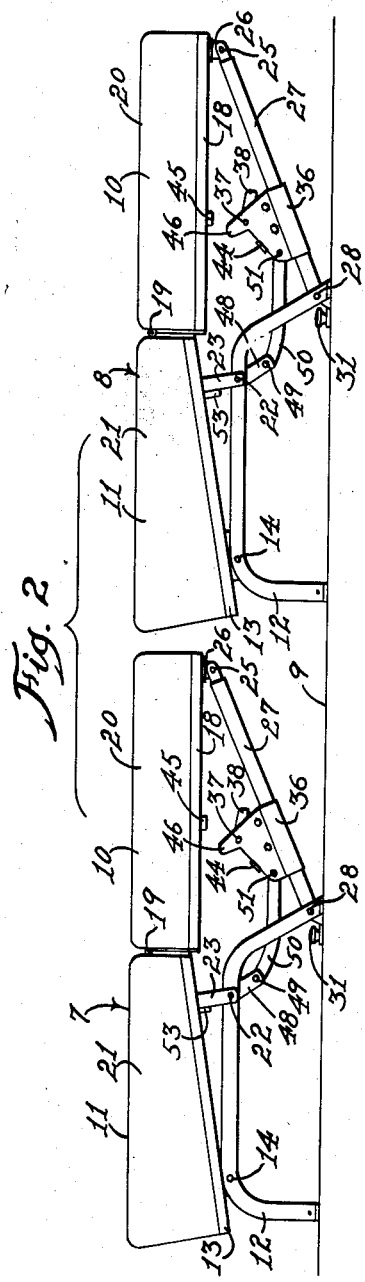
Inventor:
Earl L. Schofield Oct. 13, 1953 — E. L. SCHOFIELD — 2,655,197
CONVERTIBLE SEAT
Filed June 1, 1948 — 3 Sheets-Sheet 2

Inventor:
Earl L. Schofield

Oct. 13, 1953
E. L. SCHOFIELD
2,655,197
CONVERTIBLE SEAT
Filed June 1, 1948
3 Sheets-Sheet 3
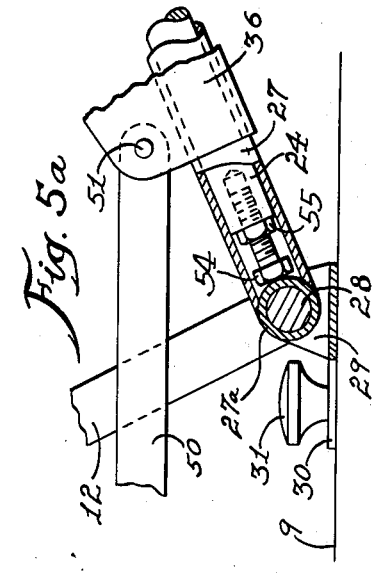
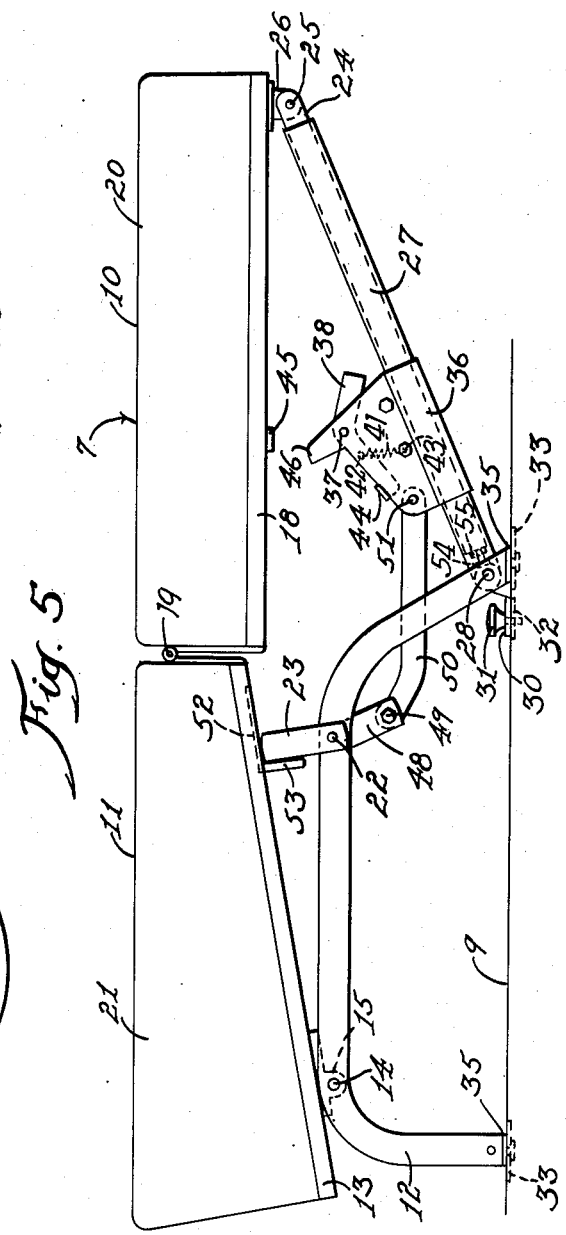
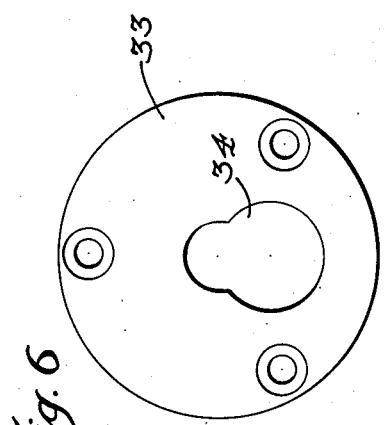
Inventor:
Earl L. Schofield

UNITED STATES PATENT OFFICE 2,655,197

CONVERTIBLE SEAT

Earl L. Schofield, Rockford, Ill., assignor, by mesne assignments, to Superior Coach Corporation, Lima, Ohio, a corporation of Ohio Application June 1, 1948, Serial No. 30,286

21 Claims. (Cl. 155—7)

This invention relates to a folding bed-type seat, or chair, especially designed and adapted for use in ambulances for the comfort of attendants and other passengers, but adapted to be converted so that two seats may be used for a chaise longue effect or may be used together to form a full sized bed, suitable for use as an auxiliary cot or support for a stretcher under emergency conditions.

The principal object of my invention is to provide a comfortable seat of the kind mentioned, in which the bottom and back portions are quickly releasably locked in a normal substantially right angle relationship by means of a single spring pressed, manually disengageable locking dog, the release of which permits the back portion of the seat to be lowered to a substantially horizontal position, and the bottom of the seat, which is hingedly connected with the back portion, to be raised from its normal inclined position to a substantially horizontal position in coplanar relationship with the back portion when the seat is unfolded. The locking dog, being disposed under the back portion of the seat, is more or less concealed and is, therefore, not apt to be tampered with, and yet is within easy reach of the operator, to be released by hand or by foot.

The back support comprises two telescoping sections, the lower one of which has its lower end pivotally connected to the base, and the upper one of which has its upper end pivotally connected to the seat back. The lower section, which carries the locking dog, has a forwardly projecting lug thereon, which, in the folding of the seat, strikes the back of the seat bottom to limit forward movement of the seat back in the folding operation, so that the seat when folded has the desired rigidity and its back will withstand forward as well as rearward thrust. The upper section also is preferably equipped with an adjustable set screw on its lower end, which, when correctly adjusted, bottoms in the lower end of the lower section to support the seat back rigidly in horizontal position.

The lower section of the telescoping support for the back of the seat is also pivotally connected to a link, which is attached to an arm extending from the middle of a cross-shaft rotatably mounted in the base of the seat, the opposite ends of this cross-shaft having arms projecting therefrom, which in the unfolding of the seat serve to raise the back portion of the seat bottom and provide support therefor in the raised substantially horizontal position of the seat bottom. The arms for raising and supporting the seat bottom in raised position strike stops projecting downwardly from the seat bottom, whereby positively to limit the unfolding movement of the seat and at the same time provide a substantially rigid bed, the last mentioned arms in lifting the said bottom being arranged to move slightly past a vertical dead-center position, so that the seat bottom is rigidly supported and any downward pressure on it tends only to force these arms into tighter engagement with the stops.

The supporting legs on the seat base provide a positive four-point anchorage for the seat to the floor, there being sockets in the floor into which end portions on the legs are releasably secured by the fastening of a single hand screw accessible at the middle of the back below each seat.

The invention is illustrated in the accompanying drawings, in which—

Fig. 1 is a side view of two convertible seats made in accordance with my invention, disposed in the usual spaced relation in an ambulance, both seats being shown folded for use by attendants or other passengers;

Fig. 2 is a side view of Fig. 1, showing the same seats unfolded to form a bed, auxiliary cot, or stretcher support, it being obvious that when only the front seat is unfolded a chaise longue effect is obtained;

Fig. 3 is a rear view of either one of the seats of Fig. 1;

Fig. 5 is a side view on the same scale as Fig. 4, showing the seat unfolded, as in Fig. 2;

Fig. 5a is an enlarged sectional detail through the lower section of the telescoping support for the seat back, showing the adjustable set screw on the lower end of the upper section, with the parts disposed as in Fig. 5, and Fig. 6 is a plan view of one of the floor socket plates.

The same reference numerals are applied to corresponding parts throughout the views.

Figure 4:
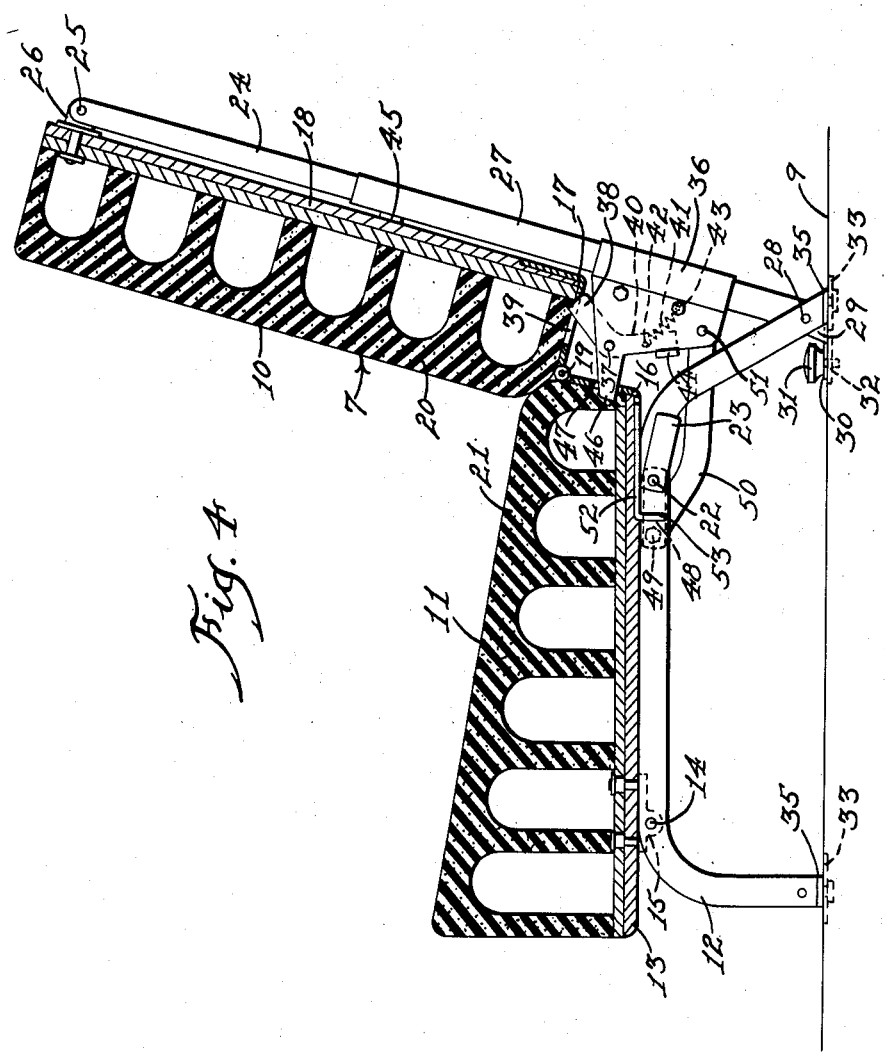
Fig. 4 is a view partly in side elevation and partly in vertical section of one of the seats of Fig. 1, on a larger scale to better illustrate the construction.

Referring first mainly to Figs. 1 to 3, the reference numerals 7 and 8 designate generally front and rear attendant's seats in an ambulance, the floor of which is indicated by the line 9. Inasmuch as these two seats are of identical construction, corresponding parts are numbered the same. 10 and 11 designate the back and bottom of both seats, and 12 the base. The bottom frame 13 on the seat bottom 11 is pivotally connected to the spaced side members of the base by means of a cross-shaft 14 and bearings 15, so that although the frame 13 normally rests on top of the base 12, as shown in Figs. 1 and 4, it may be tilted upwardly as shown in Figs. 2 and 5 to bring the top of the seat bottom into a substantially horizontal plane. Angular plates 16 and 17 are secured to the bottom frame 13 of the seat bottom 11 and back frame 18 of the seat back 10, and there are hinges 19 hingedly connecting adjoining ends of these angular plates, so that adjoining end portions of the seat back 10 and seat bottom 11 are held disposed in the proper relationship to one another whether the seat is folded or unfolded. Suitable cushions 20 and 21 are applied to the back and bottom frames 18 and 13, respectively, sponge rubber being used preferably, as indicated in Fig. 4. The cushion 21 is tapered rearwardly, but when the seat is unfolded, the seat back 10 and seat bottom 11 are disposed in substantially coplanar relationship in a horizontal plane, the seat bottom 11 having been tilted upwardly at the rear about the shaft 14 as an axis, as illustrated in Figs. 2 and 5. There is another cross-shaft 22 interconnecting the side members of the base 12 at the rear, parallel to the shaft 14, and this shaft 22, which is arranged to be turned through a little more than 90° in the unfolding of the seat, has cams or arms 23 fixed on its opposite ends arranged to engage the bottom frame 13 near the rear end thereof and lift the seat bottom 11 to the horizontal position and support it in such position so long as the seat is unfolded.

The seat back 10 has associated therewith an oscillatable support 24—27 which is of a telescoping form pivoted at 28 to the rear portion of the base 12 and by virtue of its telescoping action adjustably connected to support the seat back 10 in an upright or horizontal position. Said support comprises an upper rod section 24 pivotally connected at its upper end, as at 25, to a yoke 26 secured to the back frame 18, and a tubular lower section 27 that has a close working fit on the rod 24 and has a bearing sleeve 27a welded, or otherwise suitably secured, to its lower end for bearing support on a cross-shaft 28 suitably secured at its opposite ends to the lower ends of the rear legs of the base 12. The bearing sleeve 27a is disposed between the ears 29 of a U-shaped attaching bracket 30, which is adapted to be secured by means of a single hand screw 31 to a hold-down floor plate 32 that is suitably anchored in the floor. Other hold-down floor plates 33 are anchored in the floor under the four legs of the base and have key-hole slots 34 provided therein, into which T-shaped feet 35, provided on the lower ends of the legs of the base, are slidably lockingly engaged for quick and easy removal of the seats while, nevertheless, permitting secure enough fastening with a single hand screw 31 for each seat. Of course, only two hold-down floor plates 33 will suffice for the front legs and a single hold-down plate 32 to cooperate with the attaching bracket 30, if desired, instead of four hold-down plates 33 under the front and rear legs of the base. Now, a bracket 36 is fastened to the lower section 27 of the telescoping support for the seat back, and this bracket has pivoted thereon, as at 37, a locking dog 38 arranged to engage in a slot 39 provided in the angle plate 17 to lock the seat back 10 in its upright position. This dog 38 has an arm 40 to which is attached one end of a tension spring 41, as at 42, the other end being anchored, as at 43, to the bracket 36. This spring tends normally to swing the dog 38 in a counter-clockwise direction, and movement in that direction is limited by the engagement of a finger 44 against the front end of the bracket 36. This same finger 44 is used to release the dog 38 to permit unfolding of the seat, and it projects laterally from the bracket far enough, as indicated in Fig. 3, to be easily operable by hand or foot by an operator standing behind the seat, and yet the finger is sufficiently concealed so as not to invite tampering with it by anyone not acquainted with the mode of operation of the seat. When the seat is unfolded, as in Figs. 2 and 5, the dog 38 projects from the bracket 36 to the same extent as when the dog is disposed in the operative position of Figs. 1 and 4, locking the seat back 10 in its upright or folded position, and it is manifest that when the seat back 10 is raised from its folded position, the dog 38 ultimately strikes the back of the plate 17 and is depressed against the resistance of spring 41 as the seat back is raised further, until finally the end of the dog 38 enters the slot 39, when, of course, it is immediately projected as far as it will go under the action of the spring 41 into the slot 39, so as to take a good hold on the plate 17 and lock the seat back securely in the folded position. A rubber bumper block 45 is preferably provided on the back of the back frame 18 for abutment with and compression by the tube 27 in the folded position of the seat, to provide enough spring-back in the seat structure when folded so that the dog 38 will be held resiliently engaged with the end of the slot 39 and there will be no play between the parts and, consequently, no tendency to rattle when the vehicle is in motion. The bracket 36 has a forwardly projecting lug 46, which enters a slot 47 in the angle plate 16 on the back of the seat bottom 11 when the seat is folded and serves by engagement with the plate 16 positively to limit forward movement of the seat back 10 and accordingly positively limit compression of the bumper block 45. In other words, the lug 46 is not in engagement with the plate 16 normally, but is held out of engagement with the plate 16 under expansive force of the bumper block 45, thereby further eliminating likelihood of the seat rattling. The bumper block 45 cushions rearward thrust on the seat back 10, and lug 46 positively limits movement of the seat back 10 under forward thrust, so that the seat is substantially rigid when folded for ordinary use. The lug 46 also prevents upward tilting of the back portion of the seat bottom 11 about the axis 14 in the event a person rests his weight on the front edge portion of the seat bottom.

The shaft 22, previously mentioned, has an arm 48 fixed thereto intermediate the ends thereof, to which is pivotally connected, as at 49, the front end of a link 50, which is pivotally connected at its rear end, as at 51, to the bracket 36, whereby to cause the shaft 22 to be turned through a little more than 90° in a counter-clockwise direction when the seat back 10 is swung downwardly to its unfolded position. Plates 52 secured to the bottom frame 13 of the seat bottom 11 form bearings for the cams or arms 23 to slide on in lifting the seat bottom 11, and the front ends of these plates 52 are bent downwardly to form stops 53 for positively limiting the movement of the arms 23 and accordingly limiting the unfolding of the seat. The arms 23, as clearly appears in Figs. 2 and 5, have moved sufficiently past a vertical dead-center when they strike the stops 53, so that the seat bottom is rigidly supported and there is no danger whatever of the seat folding accidentally under load when it has been unfolded for use as a bed. As a matter of fact, downward pressure on the seat bottom 11 or seat back 10 tends merely to cause the arms 23 to bear with greater pressure against the stops 53.

The seat back 10 is also rigidly supported in lowered position as a result of the engagement of a set screw 54, provided in the lower end of rod 24, with the sleeve 27a on the lower end of the tube 27. This screw, when correctly adjusted, will not allow the seat back to sag under load, but will hold it horizontal. A lock nut 55 threaded on the screw 54 and tightened against the end of rod 24 prevents any accidental change in adjustment.

It is believed the foregoing description conveys a good understanding of the objects and advantages of my invention. The appended claims have been drawn to cover all legitimate modifications and adaptations.

I claim:

1. A convertible seat of the character described comprising, in combination, a seat bottom and a seat back hingedly connected together at adjoining edges for pivotal movement relative to one another to and from substantially coplanar relationship, a base extending in a fore and aft direction under the seat bottom, means on the front portion of said base pivotally supporting the seat bottom adjacen its front end on a horizontal axis substantially parallel with the axis of said hinge connection, an oscillatable support pivoted to the back portion of said base on a horizontal axis and adjustably connected to said seat back to support the seat back in either an upright or a horizontal position, a spring pressed latch on said support releasably engageable automatically with the lower end portion of the seat back at the end of upward swinging movement of the seat back relative to the seat bottom to upright position to hold the seat back in upright position, the seat bottom in this upright position of the seat back resting in an inclined position substantially throughout its fore and aft dimension on said base, a stop projection on said support arranged to engage the back portion of the seat bottom to prevent upward tilting of the back portion of the seat bottom off the base from the inclined position in the event downward pressure is exerted on the front portion of the seat bottom, manually operable means for releasing said latch, and means providing an operating connection between the rear portion of the seat bottom and support to raise the rear portion of said seat bottom off said base and support the seat bottom in a substantially horizontal plane when the seat is unfolded.

2. A convertible seat of the character described comprising, in combination, a seat bottom and a seat back hingedly connected together at adjoining edges for pivotal movement relative to one another to and from substantially coplanar relationship, a base, means on said base pivotally supporting the seat bottom adjacent its front end on a horizontal axis substantially parallel with the axis of said hinge connection, telescoping members, one of which is pivotally mounted on said base on a horizontal axis and the other of which is pivotally connected to the upper portion of the seat back, means for detachably rigidly connecting the seat back with said telescoping members holding the seat back in upright position, a cross-shaft rotatably mounted in said base under the rear portion of said seat bottom, cams fixed on said shaft for raising the rear portion of the seat bottom and supporting the same in a substantially horizontal plane when the shaft is turned through a predetermined angularity, and means providing an operating connection between the shaft and the base-connected one of said telescoping members to turn the shaft through said angularity in the unfolding of the seat.

3. A convertible seat of the character described comprising, in combination, a seat bottom and a seat back hingedly connected together at adjoining edges for pivotal movement relative to one another to and from substantially coplanar relationship, a base, means on said base pivotally supporting the seat bottom adjacent its front end on a horizontal axis substantially parallel with the axis of said hinge connection, telescoping members, one of which is pivotally mounted on said base on a horizontal axis and the other of which is pivotally connected to the upper portion of the seat back, a spring-pressed latch for detachably connecting the base-connected one of said telescoping members with the seat back to hold the seat back in upright position, manually operable means for releasing said latch, a bumper of compressible resilient material arranged to be compressed between the seat back and said telescoping members in the folding of said seat, whereby to maintain pressure between the latch and seat back in the locked position and prevent rattling, means on the base-connected one of said telescoping members for abutting the rear portion of the seat bottom to prevent tilting movement thereof in the event downward pressure is exerted on the front portion of the seat bottom and also positively limit compression of said bumper, and means providing an operating connection between the rear portion of the seat bottom and the base-connected one of said telescoping members to raise and support the seat bottom in a substantially horizontal plane when the seat is unfolded.

4. A convertible seat of the character described comprising, in combination, a seat bottom and a seat back hingedly connected together at adjoining edges for pivotal movement relative to one another to and from substantially coplanar relationship, a base, means on said base pivotally supporting the seat bottom adjacent its front end on a horizontal axis substantially parallel with the axis of said hinge connection, telescoping members, one of which is pivotally mounted on said base on a horizontal axis and the other of which is pivotally connected to the upper portion of the seat back, a spring-pressed latch for detachably connecting the base-connected one of said telescoping members with the seat back to hold the seat back in upright position, manually operable means for releasing said latch, a cross-shaft rotatably mounted in said base under the rear portion of said seat bottom, cams fixed on said shaft for raising the rear portion of the seat bottom and supporting the same in a substantially horizontal plane when the shaft is turned through a predetermined angularity, and means providing an operating connection between the shaft and the base-connected one of said telescoping members to turn the shaft through said angularity in the unfolding of said seat.

5. A convertible seat of the character described comprising, in combination, a seat bottom and a seat back hingedly connected together at adjoining edges for pivotal movement relative to one another to and from substantially coplanar relationship, a base, means on said base pivotally supporting the seat bottom adjacent its front end on a horizontal axis substantially parallel with the axis of said hinge connection, telescoping members, one of which is pivotally mounted on said base on a horizontal axis and the other of which is pivotally connected to the upper portion of the seat back, a spring-pressed latch for detachably connecting the base-connected one of said telescoping members with the seat back to hold the seat back in upright position, manually operable means for releasing said latch, a bumper of compressible resilient material arranged to be compressed between the seat back and said telescoping members in the folding of said seat, whereby to maintain pressure between the latch and seat back in the locked position and prevent rattling, means on the base-connected one of said telescoping members for abutting the seat bottom to positively limit upward movement of said telescoping members and accordingly positively limit compression of said bumper, a cross-shaft rotatably mounted in said base under the rear portion of said seat bottom, cams fixed on said shaft for raising the rear portion of the seat bottom and supporting the same in a substantial horizontal plane when the shaft is turned through a predetermined angularity, and means providing an operating connection between the shaft and the base-connected one of said telescoping members to turn the shaft in one direction in the unfolding of said seat and in the opposite direction in the folding of the seat.

6. A convertible seat of the character described comprising, in combination, a seat bottom and a seat back hingedly connected together at adjoining edges for pivotal movement relative to one another to and from substantially coplanar relationship, a base extending in a fore and aft direction under the seat bottom, means on the front portion of said base pivotally supporting the seat bottom adjacent its front end on a horizontal axis substantially parallel with the axis of said hinge connection, an oscillatable support pivoted to the back portion of said base on a horizontal axis and adjustably connected to said seat back to support the seat back in either an upright or a horizontal position, a spring pressed latch on said support releasably engageable automatically with the lower end portion of the seat back at the end of upward swinging movement of the seat back relative to the seat bottom to upright position to hold the seat back in upright position, the seat bottom in this upright position of the seat back resting in an inclined position substantially throughout its fore and aft dimension on said base, a stop projection on said support arranged to engage the back portion of the seat bottom to prevent upward tilting of the back portion of the seat bottom off the base from the inclined position in the event downward pressure is exerted on the front portion of the seat bottom, manually operable means for releasing said latch, a cross-shaft rotatably mounted in said base under the rear portion of said seat bottom, arms rotatable with said shaft and arranged slidingly to engage the seat bottom to raise the rear portion of said seat bottom off said base, stops on the seat bottom engageable by said arms when they have been turned past a vertical dead-center position so as to provide non-collapsible support in the unfolded horizontal position for the seat bottom and seat back connected thereto, and means providing an operating connection between the shaft and said support to turn the shaft in one direction in the unfolding of said seat and in the opposite direction in the folding of the seat.

7. A convertible seat of the character described comprising, in combination, a seat bottom and a seat back hingedly connected together at adjoining edges for pivotal movement relative to one another to and from substantially coplanar relationship, a base extending in a fore and aft direction under the seat bottom, means on the front portion of said base pivotally supporting the seat bottom adjacent its front end on a horizontal axis substantially parallel with the axis of said hinge connection, telescoping members, one of which is pivotally mounted on said base on a horizontal axis and the other of which is pivotally connected to the upper portion of the seat back, a spring pressed latch for detachably connecting the base-connected one of said telescoping members with the seat back to hold the seat back in upright position, manually operable means for releasing said latch, a cross-shaft rotatably mounted in said base under the rear portion of said seat bottom, arms rotatable with said shaft and arranged slidingly to engage the seat bottom to raise the rear portion of said seat bottom off said base, stops on the seat bottom engageable by said arms when they have been turned past a vertical dead-center position so as to provide non-collapsible support in the unfolded horizontal position for the seat bottom and seat back connected thereto, and means providing an operating connection between the shaft and the base-connected one of said telescoping members to turn the shaft in one direction in the unfolding of said seat and in the opposite direction in the folding of the seat.

8. A convertible seat of the character described comprising, in combination, a seat bottom and a seat back hingedly connected at adjoining edges for pivotal movement relative to one another to and from substantially coplanar relationship, a supporting base extending in a fore and aft direction under the seat bottom, means on the front portion of said base for pivotally supporting the seat bottom adjacent the front end thereof on a horizontal axis substantially parallel with the axis of said hinge connection, an oscillatable support pivoted to the rear portion of the base and adjustably connected to said seat back to support the seat back in an upright or horizontal position, a manually releasable latch for detachably rigidly connecting the seat back with said oscillatable support to hold the seat back in upright position, the seat bottom in this upright position of the seat back resting in an inclined position substantially throughout its fore and aft dimension on said base, a stop projection on said support arranged to engage the back portion of the seat bottom to prevent upward tilting of the back portion of the seat bottom off the base from the inclined position in the event downward pressure is exerted on the front portion of the seat bottom, and means providing an operating connection between the rear portion of the seat bottom and the oscillatable support to raise the rear portion of the seat bottom off the base and support the seat bottom in a substantially horizontal plane when the seat is unfolded.

9. A convertible seat of the character described comprising, in combination, a seat bottom and a seat back hingedly connected at adjoining edges for pivotal movement relative to one another to and from substantially coplanar relationship, a supporting base, means on said base for pivotally supporting the seat bottom adjacent the front end thereof on a horizontal axis substantially parallel with the axis of said hinge connection, an oscillatable support pivoted to the rear portion of the base and adjustably connected to said seat back to support the seat back in an upright or horizontal position, means for detachably rigidly connecting the seat back with said oscillatable support to hold the seat back in upright position, a cross-shaft rotatably mounted in said base under the rear portion of said seat bottom, cams fixed on said shaft for raising the rear portion of the seat bottom and supporting the same in a substantially horizontal plane when the shaft is turned through a predetermined angularity, and means providing an operating connection between the shaft and the oscillatable support to turn the shaft through said angularity in the unfolding of the seat.

10. A convertible seat of the character described comprising, in combination, a seat bottom and a seat back hingedly connected at adjoining edges for pivotal movement relative to one another to and from substantially coplanar relationship, a supporting base, means on said base for pivotally supporting the seat bottom adjacent the front end thereof on a horizontal axis substantially parallel with the axis of said hinge connection, an oscillatable support pivoted to the rear portion of the base and adjustably connected to said seat back to support the seat back in an upright or horizontal position, a spring-pressed latch on the oscillatable support releasably engageable with the seat back to hold the seat back in upright position, manually operable means for releasing said latch, a cross-shaft rotatably mounted in said base under the rear portion of said seat bottom, cams fixed on said shaft for raising the rear portion of the seat bottom and supporting the same in a substantially horizontal plane when the shaft is turned through a predetermined angularity, and means providing an operating connection between the shaft and the oscillatable support to turn the shaft through said angularity in the unfolding of said seat.

11. A convertible seat of the character described comprising, in combination, a seat bottom and a seat back hingedly connected at adjoining edges for pivotal movement relative to one another to and from substantially coplanar relationship, a supporting base, means on said base pivotally supporting the seat bottom adjacent the front end thereof on a horizontal axis substantially parallel with the axis of said hinge connection, an oscillatable support pivoted to the rear portion of the base and adjustably connected to said seat back to support the seat back in an upright or horizontal position, a spring-pressed latch on the oscillatable support releasably engageable with the seat back to hold the seat back in upright position, manually operable means for releasing said latch, a bumper of compressible resilient material arranged to be compressed between the seat back and said oscillatable support in the folding of said seat, whereby to maintain pressure between the latch and seat back in the locked position and prevent rattling, means on the oscillatable support for abutting the seat bottom to positively limit upward movement of said oscillatable support and accordingly positively limit compression of said bumper, a cross-shaft rotatably mounted in said base under the rear portion of said seat bottom, cams fixed on said shaft for raising the rear portion of the seat bottom and supporting the same in a substantially horizontal plane when the shaft is turned through a predetermined angularity, and means providing an operating connection between the shaft and the oscillatable support to turn the shaft in one direction in the unfolding of said seat and in the opposite direction in the folding of said seat.

12. A convertible seat of the character described comprising, in combination, a seat bottom and a seat back hingedly connected at adjoining edges for pivotal movement relative to one another to and from substantially coplanar relationship, a supporting base extending in a fore and aft direction under the seat bottom, means on the front portion of said base for pivotally supporting the seat bottom adjacent the front end thereof on a horizontal axis substantially parallel with the axis of said hinge connection, an oscillatable support pivoted to the rear portion of the base and adjustably connected to said seat back to support the seat back in an upright or horizontal position, means for detachably rigidly connecting the seat back with said oscillatable support to hold the seat back in upright position, the seat bottom in this upright position of the seat back resting in an inclined position substantially throughout its fore and aft dimension on said base, a cross-shaft rotatably mounted in said base under the rear portion of said seat bottom, arms rotatable with said shaft and arranged slidingly to engage the seat bottom to raise the rear portion of said seat bottom off said base, stops on the seat bottom engageable by said arms when they have been turned past a vertical dead-center position so as to provide non-collapsible support in the unfolded horizontal position for the seat bottom and seat back connected thereto, and means providing an operating connection between the shaft and oscillatable support to turn the shaft in one direction in the unfolding of said seat and in the opposite direction in the folding of the seat.

13. A convertible seat of the character described comprising, in combination, a seat bottom and a seat back hingedly connected at adjoining edges for pivotal movement relative to one another to and from substantially coplanar relationship, a supporting base extending in a fore and aft direction under the seat bottom, means on the front portion of said base for pivotally supporting the seat bottom adjacent the front end thereof on a horizontal axis substantially parallel with the axis of said hinge connection, an oscillatable support pivoted to the rear portion of the base and adjustably connected to said seat back to support the seat back in an upright or horizontal position, a spring-pressed latch for detachably connecting the oscillatable support with the seat back to hold the seat back in upright position, manually operable means for releasing said latch, a bumper of compressible resilient material arranged to be compressed between the seat back and said oscillatable support in the folding of said seat, whereby to maintain pressure between the latch and seat back in the locked position and prevent rattling, means on the oscillatable support for abutting the rear portion of the seat bottom to prevent tilting movement of the seat bottom in either direction from the inclined position when the support is in upright position and accordingly positively limit compression of said bumper, the seat bottom in this upright position of the seat back resting in an inclined position substantially throughout its fore and aft dimension on said base, a cross-shaft rotatably mounted in said base under the rear portion of said seat bottom, arms rotatable with said shaft and arranged slidingly to engage the seat bottom to raise the rear portion of said seat bottom off said base, stops on the seat bottom engageable by said arms when they have been turned past a vertical dead-center position, so as to provide non-collapsible support in the unfolded horizontal position for the seat bottom and seat back connected thereto, and means providing an operating connection between the shaft and oscillatable support to turn the shaft in one direction in the unfolding of said seat and in the opposite direction in the folding of the seat.

14. A convertible seat of the character described comprising, in combination, a seat bottom and a seat back hingedly connected together at adjoining edges for pivotal movement relative to one another to and from substantially coplanar relationship, a base extending in a fore and aft direction under the seat bottom, means on the front portion of said base pivotally supporting the seat bottom adjacent its front end on a horizontal axis substantially parallel with the axis of said hinge connection, an oscillatable support pivoted to the back portion of said base on a horizontal axis and adjustably connected to said seat back to support the seat back in an upright or horizontal position, interfitting parts on said seat bottom and oscillatable support for detachably connecting the rear portion of the seat bottom and the said oscillatable support when the seat back is raised to upright position, a spring pressed latch for detachably connecting said oscillatable support with the lower portion of the seat back in the upright position thereof, and manually operable means for releasing said latch.

15. A convertible seat of the character described comprising, in combination, a seat bottom and a seat back hingedly connected together at adjoining edges for pivotal movement relative to one another to and from substantially coplanar relationship, a base extending in a fore and aft direction under the seat bottom, means on the front portion of said base pivotally supporting the seat bottom adjacent its front end on a horizontal axis substantially parallel with the axis of said hinge connection, an oscillatable support pivoted to the back portion of said base on a horizontal axis and adjustably connected to said seat back to support the seat back in an upright or horizontal position, interfitting parts on said seat bottom and oscillatable support for detachably connecting the rear portion of the seat bottom and the said oscillatable support when the seat back is raised to upright position, a spring pressed latch for detachably connecting said oscillatable support with the lower portion of the seat back in the upright position thereof, manually operable means for releasing said latch, and means providing an operating connection between the rear portion of the seat bottom and said oscillatable support to raise the rear portion of said seat bottom off said base and support it and the attached seat back in a substantially horizontal plane when the seat is unfolded.

16. A convertible seat of the character described comprising, in combination, a seat bottom and a seat back hingedly connected together at adjoining edges for pivotal movement relative to one another to and from substantially coplanar relationship, a base, means on said base pivotally supporting the seat bottom adjacent its front end on a horizontal axis substantially parallel with the axis of said hinge connection, telescoping members, one of which is pivotally mounted on said base on a horizontal axis and the other of which is pivotally connected to the upper portion of the seat back to support the latter in upright or horizontal position, interfitting parts on said seat bottom and said base connected to one of said telescoping members for detachably connecting the rear portion of the seat bottom and the base connected to one of said telescoping members, when the seat back is raised to upright position, a spring pressed latch for detachably connecting said base connected to one of said telescoping members with the lower portion of the seat back in the upright position thereof, and manually operable means for releasing said latch.

17. A convertible seat of the character described comprising, in combination, a seat bottom and a seat back hingedly connected together at adjoining edges for pivotal movement relative to one another to and from substantially coplanar relationship, a base extending in a fore and aft direction under the seat bottom, means on the front portion of said base pivotally supporting the seat bottoms adjacent its front end on a horizontal axis substantially parallel with the axis of said hinge connection, telescoping members, one of which is pivotally connected to the back portion of said base on a horizontal axis and other of which is connected to said seat back to support the seat back in upright or horizontal position, interfitting parts on said seat bottom and said base connected one of said telescoping members for detachably connecting the rear portion of the seat bottom and the said base connected to one of said telescoping members when the seat back is raised to upright position, a spring pressed latch for detachably connecting said base connected to one of said telescoping members with the lower portion of the seat back in the upright position thereof, manually operable means for releasing said latch, and means providing an operating connection between the rear portion of the seat bottom and said base connected to one of said telescoping members to raise the rear portion of said seat bottom off said base and support it and the attached seat back in a substantially horizontal plane when the seat is unfolded.

18. A convertible seat of the character described, comprising, in combination, a seat bottom and a seat back hingedly connected together at adjoining edges for pivotal movement relative to one another to and from substantially coplanar relationship, a base extending in a fore and aft direction under the seat bottom, means on the front portion of said base pivotally supporting the seat bottom adjacent its front end on a horizontal axis substantially parallel with the axis of said hinge connection, an oscillatable support pivoted to the back portion of said base on a horizontal axis and adjustably connected to said seat back to support the seat back in upright or horizontal position, a bracket rigid with and projecting toward the seat from the lower portion of said oscillatable support and having a projecting lug thereon arranged to enter a slot provided in the rear portion of the seat bottom to connect the seat bottom and support detachably when the seat back is raised to upright position, a spring pressed latch on said bracket for detachably connecting the lower portion of the said back with said oscillatable support when the seat back is in upright position, and manually operable means for releasing said latch.

19. A convertible seat of the character described comprising, in combination, a seat bottom and a seat back hingedly connected together at adjoining edges for pivotal movement relative to one another to and from substantially coplanar relationship, a base extending in a fore and aft direction under the seat bottom, means on the front portion of said base pivotally supporting the seat bottom adjacent its front end on a horizontal axis substantially parallel with the axis of said hinge connection, an oscillatable support pivoted to the back portion of said base on a horizontal axis and adjustably connected to said seat back to support the seat back in upright or horizontal position, a bracket rigid with and projecting toward the seat from the lower portion of said oscillatable support and having a projecting lug thereon arranged to enter a slot provided in the rear portion of the seat bottom to connect the seat bottom and support detachably when the seat back is raised to upright position, a spring pressed latch on said bracket for detachably connecting the lower portion of said back with said oscillatable support when the seat back is in upright position, manually operable means for releasing said latch, and means providing an operating connection between the said bracket and the rear portion of the seat bottom to raise the rear portion of said seat bottom off said base and support it and the attached seat back in a substantially horizontal plane when the seat is unfolded.

20. A convertible seat of the character described comprising, in combination, a seat bottom and a seat back hingedly connected together at adjoining edges for pivotal movement relative to one another to and from substantially coplanar relationship, a base, means on said base pivotally supporting the seat bottom adjacent its front end on a horizontal axis substantially parallel with the axis of said hinge connection, telescoping members, one of which is pivotally mounted on said base on a horizontal axis and the other of which is pivotally connected to the upper portion of the seat back, a bracket rigid with and projecting toward the seat from the lower portion of the base-connected one of said telescoping members and having a projecting lug thereon arranged to enter a slot provided in the rear portion of the seat bottom to connect the seat bottom and member detachably when the seat back is raised to upright position, a spring pressed latch on said bracket for detachably connecting the lower portion of said back with said base-connected one of said telescoping members when the seat back is in upright position, and manually operable means for releasing said latch.

21. A convertible seat of the character described comprising, in combination, a seat bottom and a seat back hingedly connected together at adjoining edges for pivotal movement relative to one another to and from substantially coplanar relationship, a base, means on said base pivotally supporting the seat bottom adjacent its front end on a horizontal axis substantially parallel with the axis of said hinge connection, telescoping members, one of which is pivotally mounted on said base on a horizontal axis and the other of which is pivotally connected to the upper portion of the seat back, a bracket rigid with and projecting toward the seat from the lower portion of the base-connected one of said telescoping members and having a projecting lug thereon arranged to enter a slot provided in the rear portion of the seat bottom to connect the seat bottom and member detachably when the seat back is raised to upright position, a spring pressed latch on said bracket for detachably connecting the lower portion of said back with said base-connected one of said telescoping members when the seat back is in upright position, manually operable means for releasing said latch, and means providing an operating connection between the said bracket and the rear portion of the seat bottom to raise the rear portion of said seat bottom off said base and support it and the attached seat back in a substantially horizontal plane when the seat is unfolded.

EARL L. SCHOFIELD.

References Cited in the file of this patent

UNITED STATES PATENTS

| Number | Name | Date |
|---|---|---|
| 1,210,749 | Ziehlke | Jan. 2, 1917 |
| 2,304,199 | Pinnow | Dec. 8, 1942 |

FOREIGN PATENTS

| Number | Country | Date |
|---|---|---|
| 352,686 | Great Britain | July 16, 1931 |